(12) United States Patent
Yao et al.

(10) Patent No.: US 6,694,239 B1
(45) Date of Patent: Feb. 17, 2004

(54) SYSTEM AND METHOD OF CONTROLLING VEHICLE STEER-BY-WIRE SYSTEMS

(75) Inventors: Yixin Yao, Ann Arbor, MI (US); Gregory J. Stout, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/321,920

(22) Filed: Dec. 17, 2002

(51) Int. Cl.$^7$ .............................. B62B 5/00; G06F 7/00
(52) U.S. Cl. .......................... 701/41; 701/36; 180/410; 180/446
(58) Field of Search ................................. 701/1, 41, 42, 701/43, 36, 37, 38, 29; 340/465; 180/400–410, 443, 446, 447; 303/140, 146, 155, 185

(56) References Cited

U.S. PATENT DOCUMENTS

| | | | |
|---|---|---|---|
| 4,930,084 A | | 5/1990 | Hosaka et al. |
| 5,180,214 A | | 1/1993 | Yeh et al. |
| 6,370,460 B1 | | 4/2002 | Kaufmann et al. |
| 6,442,462 B1 | * | 8/2002 | Nishizaki et al. ............. 701/41 |
| 6,609,052 B2 | * | 8/2003 | Radamis et al. .............. 701/41 |
| 6,611,745 B1 | * | 8/2003 | Paul ............................. 701/41 |
| 6,612,392 B2 | * | 9/2003 | Park et al. .................. 180/402 |
| 6,640,167 B1 | * | 10/2003 | Carroll et al. ................. 701/34 |

\* cited by examiner

Primary Examiner—Richard M. Camby
(74) Attorney, Agent, or Firm—Brinks Hofer Gilson & Lione

(57) ABSTRACT

The present invention involves a method of controlling a vehicle steer-by-wire system having two independent road wheels. In one embodiment, the method comprises providing a steering wheel control sub-system to generate road wheel reference angles and to produce steering feel for a vehicle driver. The method further includes providing a road wheel control sub-system including a multivariable road wheel controlled plant and a multivariable road wheel controller for controlling actual road wheel angles to track to road wheel reference angles within a servo control system structure having road wheel angular position feedback and road wheel angular rate feedback loops. The method includes modeling the multivariable road wheel controlled plant and implementing the multivariable road wheel controller. Moreover, the method includes applying road wheel angles and angular rates as feedback signals to construct a servo control system with the multivariable controlled plant and the multivariable road wheel controller to implement the left and right road wheel angles tracking for left and right road wheel reference angles. Then, the method includes receiving left and right road wheel reference angles being based on the steering wheel angle command from the steering wheel control sub-system and receiving the left and right road wheel angles from the multivariable road wheel controlled plant. The method includes calculating the left and right road wheel angle errors based on the left and right road wheel angles and left and right road wheel reference angles and generating the left and right road wheel torque control variables from the multivariable road wheel controller with servo control performances based on the left and right road wheel angle errors. After generating road wheel torque control variables, the method includes applying torque control variables of the multivariable road wheel controller to the multivariable controlled plant to control tracking of the actual left and right wheel angles with the left and right road wheel reference angles, respectively.

25 Claims, 5 Drawing Sheets

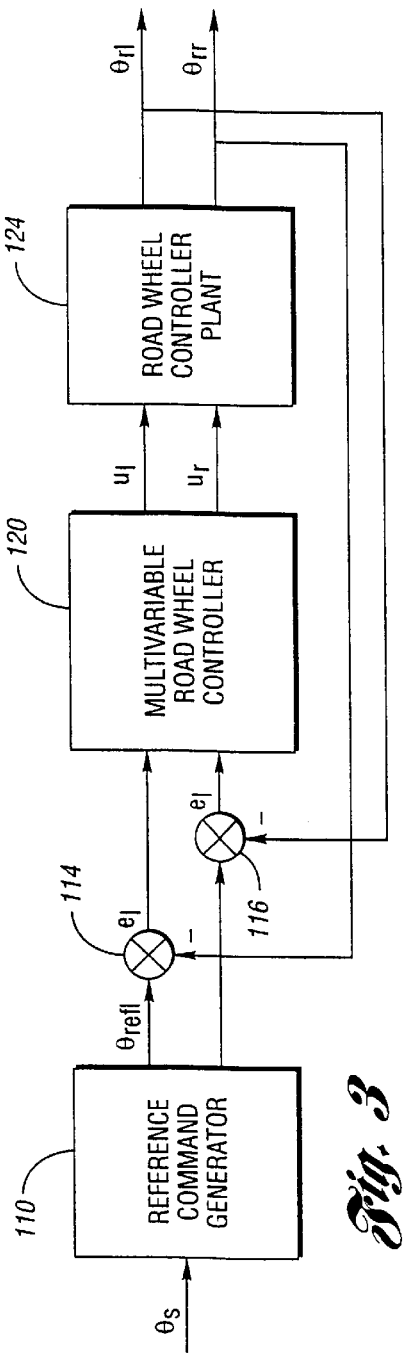
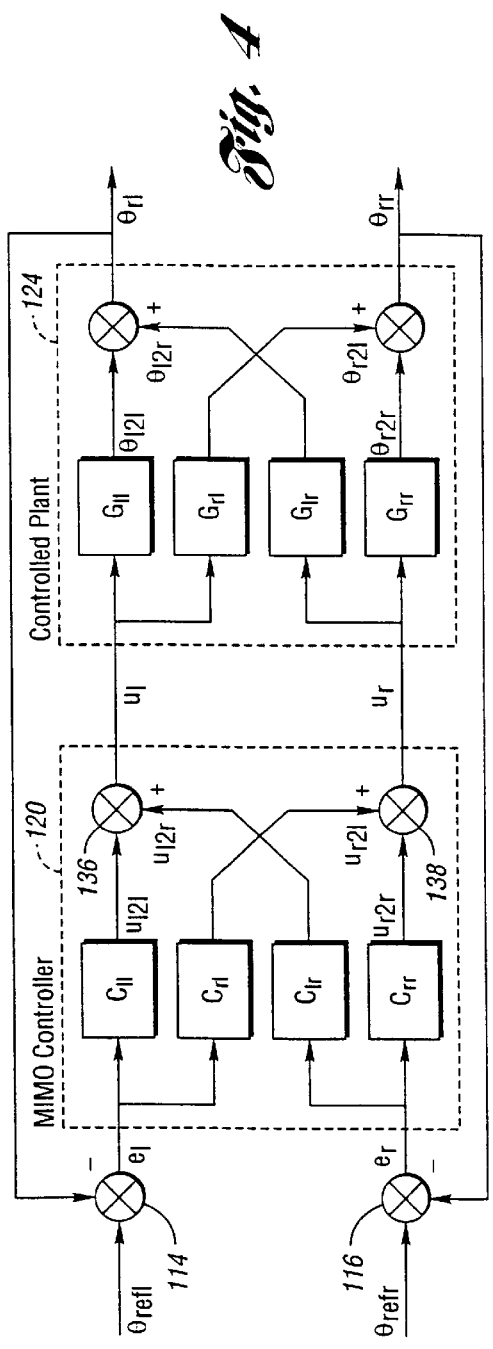
Fig. 3
Fig. 4

SYSTEM AND METHOD OF CONTROLLING VEHICLE STEER-BY-WIRE SYSTEMS

BACKGROUND OF THE INVENTION

The present invention relates to a system and method of controlling vehicle steer-by-wire systems.

Steer-by-wire systems replace mechanical linkages between the steering wheel and the front road wheels of a vehicle with electrical wires and electronic components. Moreover, the mechanical linkages between the two front road wheels are eliminated in some kind of steer-by-wire systems. Instead, two independent actuators are installed on the vehicle, wherein each actuator independently actuates one of the front road wheels. This allows the two front road wheels be able to move independently from each other. Thus, a steer-by-wire system may be regarded as having two parts: a steering wheel sub-system and a road wheel sub-system. The electrical signals are translated through the wires to link the steering wheel sub-system to the road wheel sub-system with two independent front road wheels.

There is a need to provide a more flexible application environment within the steer-by-wire systems with two independent front road wheels to realize different left and right road wheel angle requirements such that the vehicle dynamics and safety can be improved. Steering functions, including different left and right road wheel angle requirements, need to be realized by utilizing the control system design.

Control system designers for such steer-by-wire systems face several challenges. First of all, a coupling between the left and right road wheel angles is experienced and a varying degree of coupling is produced with changing road conditions and vehicle dynamics. Typically, a change in an input control variable of a road wheel actuator will more than likely affect a proportional change in the directional angles of both left and right front road wheels. Thus, different left and right road wheel reference angles cannot be achieved by using independent left and right road wheel controller without consideration of road wheel angle coupling. It is a challenge for control system designers of steer-by-wire systems to control separately and independently each vehicle road wheel angle under an influence of coupling between road wheel angles.

Other challenges for control system designers include considering uncertain perturbations and severe non-linear characteristics of vehicle dynamics and actuator based steer-by-wire system. Typically, the vehicle dynamics change with road conditions, vehicle load, and external circumstances. A nonlinear relationship between road wheel actuator control input and road wheel angle output variables exists due to vehicle dynamics influence. The vehicle dynamics with uncertain perturbations and severe nonlinear characteristics may significantly affect the stability and performance of a steer-by-wire system of the vehicle. Moreover, the modeling accuracy of the controlled steer-by-wire system may not be sufficient to achieve the control performance specifications because of uncertainties and non-linear characteristics.

BRIEF SUMMARY OF THE INVENTION

The present invention generally provides a system and method of controlling vehicle steer-by-wire systems with two independent front road wheels. The steer-by-wire system in accordance with the present invention may be viewed as having two parts: a steering wheel sub-system and a road wheel sub-system with two independent front road wheels. Electrical signals are transmitted via electrical wires to link the steering wheel sub-system to the road wheel sub-system. Main functions of the steering wheel sub-system are to provide a steering directional reference angle and produce an appropriate steering feel to a driver of the vehicle. Main functions of the road wheel sub-system are to establish tracking between road wheel angles and a steering wheel angle reference input which is provided by the steering wheel sub-system. These two subsystems are integrated in the steer-by-wire system to maintain alignment between the steering wheel and the road wheels of the vehicle and to implement vehicle steering functions.

A servo feedback control is introduced to the steer-by-wire control system design and is implemented in the steer-by-wire system in accordance with the present invention. This allows each of road wheel angles to track a respective road wheel input reference angle with minimum tracking error. The servo stiffness of roads wheels makes the vehicle to have the capability to reject the disturbances for the vehicle, such as wind gust disturbance.

To model a controlled road wheel system with two road wheel angle loop interactions, a multiple-input and multiple-output (MIMO) model description is applied to represent an inherent coupling characteristic between actuator control input variables and road wheel angle output variables.

The multivariable control with a multivariable controller is introduced to road wheel servo control system design and is implemented in the road wheel sub-system of the steer-by-wire system. The multivariable controller with decoupling characteristic reduces the affects of road wheel angle loop interactions. In other words, the present invention "decouples" the dependent road wheel angle variables and allows each road wheel to be controlled independently of each other by using a multivariable controller. The steer-by-wire system allows for an angle input variable for a corresponding road wheel to affect only the angle output variable of the corresponding road wheel rather than affecting both left and right road wheel angles.

By using a robust control strategy in the multivariable road wheel control system, the effect of uncertainty and disturbance may be reduced, and control system robust stability and performance may be improved. By using a gain scheduling control strategy in the multivariable road wheel control system, the gains of the controller changes automatically with the vehicle speed to compensate the gain change of the controlled road wheel system. Thus, the effect of non-linearity may be reduced and control system tracking performance may be improved.

In one embodiment of the present invention, a multivariable $H_\infty$ control is implemented as one example of a multivariable road wheel system control. The multivariable $H_\infty$ control design considers the uncertain perturbations and external disturbances existed in the road wheel subsystem. This provides a robust multivariable control for controlling the road wheel sub-system. The multivariable $H_\infty$ control design may consider the coupling of the controlled plant reduces the affects of road wheel angle interactions by decoupling design.

To obtain the different left and right road wheel reference angles, the reference command generator of the road wheel sub-system for the steer-by-wire system is implemented. The reference command generator receives a steering wheel angle and some vehicle variables and generates separate left and right road wheel reference angles. The variable steering ratios are implemented by using vehicle speed as a scheduling signal to obtain the different left and right road wheel reference angles. A calibration for left and right road wheel angles is performed according to vehicle geometry and steering performance requirements using vehicle variables.

The above-mentioned steer-by-wire systems with two independent front road wheels provide a more flexible application environment to realize different left and right road wheel angle requirements and to improve the vehicle dynamics. The control algorithms are implemented using a software program in a microprocessor-based steer-by-wire control module.

Further aspects, features and advantages of the invention will become apparent from consideration of the following erudite description and the appended claims when taken in connection with the accompanying drawings.

BRIEF DESCRIPTION OF THE DRAWINGS

FIG. 3 is a block diagram of the road wheel sub-system for the steer-by-wire system shown in FIG. 2;

FIG. 4 is a block diagram of a multivariable road wheel feedback control including the multivariable controller and the controlled road wheel plant shown in FIG. 3;

DETAILED DESCRIPTION OF THE INVENTION

Figure 1:
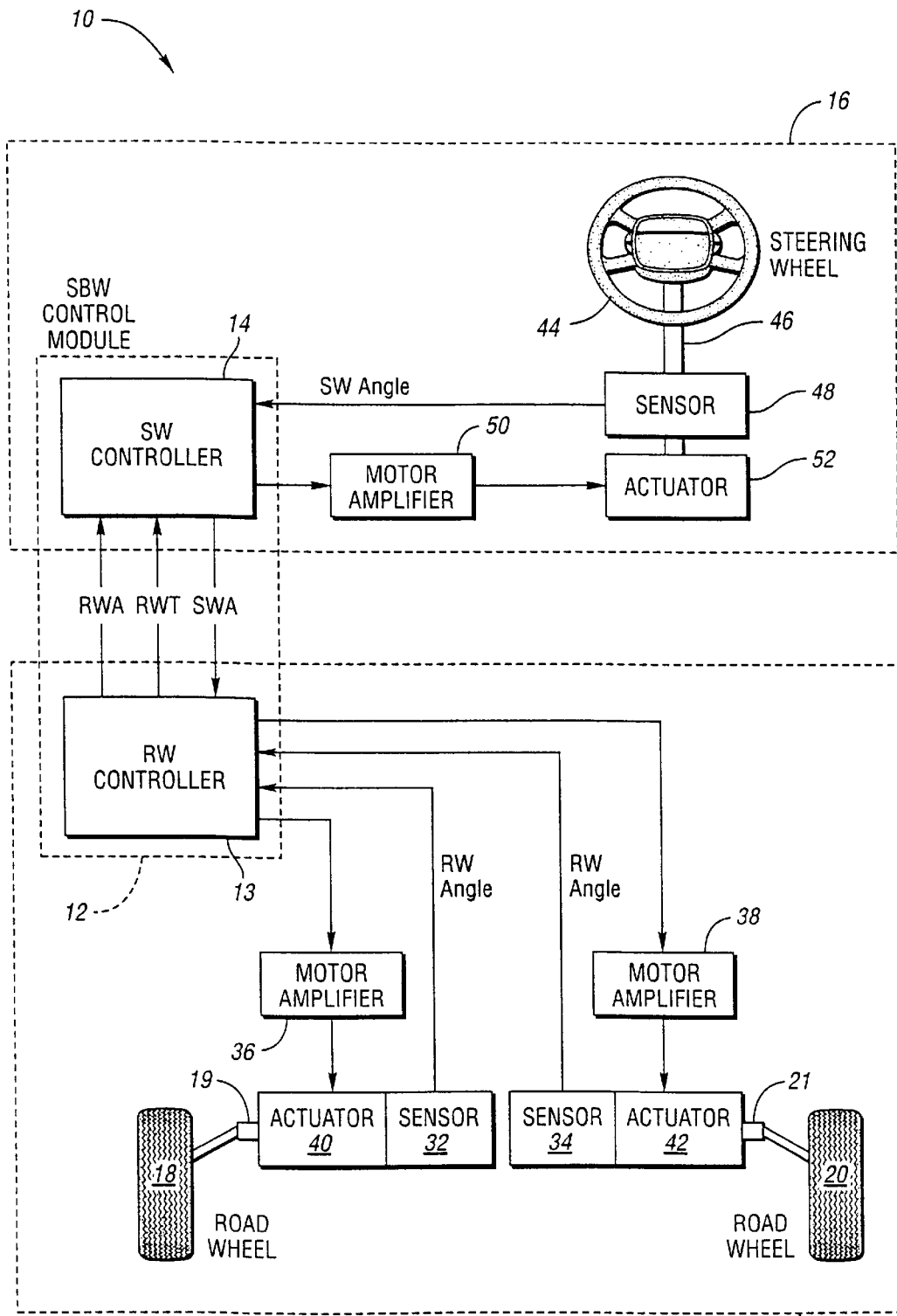
FIG. 1 is a schematic diagram of a vehicle steer-by-wire system assembly in accordance with the present invention.

FIG. 1 illustrates a vehicle steer-by-wire system 10 in accordance with the present invention. As shown, the vehicle steer-by-wire system 10 has dependent left and right front road wheels. As shown in FIG. 1, steer-by-wire system 10 is composed of a road wheel subsystem 15 and a steering wheel system 16. Steer-by-wire system 10 includes steer-by-wire control module 12 having a road wheel controller 13 of a road wheel sub-system 15 and a steering wheel controller 14 of a steering wheel sub-system 16. Steer-by-wire control module 12 links road wheel sub-system 15 and steering wheel sub-system 16.

As shown in FIG. 1, road wheel sub-system 15 includes left road wheel 18 connected to a left tie rod 19 and right road wheel 20 connected to a right tie rod 21. Road wheel sub-system 15 further includes left and right road wheel actuators 40, 42 in electrical communication with left and right motor amplifiers 36, 38, respectively. Left and right motor amplifiers 36, 38 for receiving control signals from road wheel controller 13. Actuators 40, 42 receive current signals from respective amplifiers 36, 38 to produce torques on the left and right road wheels 18 and 20, respectively. Left road wheel angle sensor 32 is attached to left road wheel actuator 40 to sense left road wheel angle. Right road wheel angle sensor 34 is attached to right road wheel actuator 42 to sense right road wheel angle. Left and right road wheel sensors 32, 34 are in electrical communication with road wheel controller 13 for sending signals indicative of left and right road wheels angles to be processed by controller 13. Road wheel controller 13 receives a plurality of input signals to produce road wheel control signals to control the left and right road wheels 18, 20 using actuators 40, 42, respectively.

In a conventional steering system of a vehicle with typical mechanical connections, a road wheel will directly receive steering wheel inputs from the steering wheel of the vehicle. Moreover, the road wheel angles will mechanically track the steering wheel angle. In the steer-by-wire system of the present invention, with the above road wheel sub-system 15 (without mechanical connection), a steering angle signal may be transmitted to the road wheel sub-system electrically using wires. Therefore, one function of the road wheel sub-system 15 is to achieve tracking of the road wheel angles for a steering wheel reference angle. Furthermore, each road wheel angle should independently track the steering angle reference angle, and two road wheel angles do not affect each other. Such a tracking function may be realized by using control system design method implemented in the road wheel controller 13 of the above-mentioned road wheel sub-system 15.

The road wheel control system design should consider the road wheel angle coupling effect, road wheel system uncertainty, and nonlinearity. As described in greater detail below, the road wheel controller 13 of the road wheel sub-system 15 controls each road wheel independently and separately to implement the road wheel angle tracking function to track the steering wheel angle by using multivariable control design methods.

Steering wheel sub-system 16 includes steering wheel 44 mounted to steering shaft 46. In this embodiment, steering wheel sensor 48 is mounted to steering shaft 46 or steering wheel actuator 52 for sensing a steering wheel angle. Steering wheel sensor 48 is in electrical communication with steering wheel controller 14 which receives from sensor 48 signals indicative of steering wheel angle. Steering wheel sub-system 16 further includes steering wheel motor amplifier 50 which is in electrical communication with steering wheel controller 14 for receiving control signal and for providing a current signal to steering wheel actuator 52. Steering wheel actuator 52 is in electrical communication with motor amplifier 50 and is attached to steering shaft 46 for receiving current from amplifier 50 and for producing a reaction torque on the steering wheel 44. Steering wheel controller 14 receives steering wheel angle signal, road wheel angle signals, road wheel torque signal, and vehicle signals (not shown) and produces a steering wheel control signal.

In a conventional steering system with mechanical connections, a vehicle driver directly controls the vehicle's direction by turning the steering wheel and obtains a steering feel through a resulting torque in the steering shaft. The steering feel provides information regarding contact surfaces between the tires of the vehicle road wheels and the ground. Steering feel can be significant to the driver for the vehicle's directional control and vehicle driving safety. In the steer-by-wire system without mechanical connection between the steering wheel and road wheels in accordance with the present invention, a familiar steering feel can be produced by steering wheel control sub-system with feedback control structure. Therefore, main functions of the steering wheel sub-system 16 are to provide a realistic steering feel for the vehicle driver and a steering wheel angle reference signal for the road wheel sub-system 15.

Furthermore, the steering wheel sub-system 16 should provide an active steering wheel return function with different rates when the driver releases the steering wheel when the vehicle is in movement. Thus, steering wheel is not limited to follow the road wheel as it used to be in the conventional steering system. As a special case of active steering wheel return requirement, the steering wheel should stop in a certain angular position when the driver releases the steering wheel when the vehicle is in parking. These functions can be realized by using control system design method implemented in the steering wheel controller 14 of the above-mentioned steering wheel sub-system 16.

The steering wheel sub-system 16 provides a steering feel, an active steering wheel return with different rate and a steering wheel stop function by the control system design. In this embodiment, the control system design should consider how to satisfy all functions in a control system framework under the requirements of satisfying the stability and performances of steering wheel sub-system 16. It is to be noted that the present invention focuses on a variable steering feel using a steering wheel feedback control system. As described below, the steering wheel controller 14 of the steering wheel sub-system 16 implements the control of the steering wheel reaction torque which is related to the steering feel.

As shown in FIG. 1, steering wheel controller 14 is in electrical communication with road wheel controller 13. The controllers 13 and 14 are integrated in a steer-by-wire control module 12 to implement the steering functions mentioned above. Moreover, the steer-by-wire control module 12 receives additional vehicle signals, e.g., vehicle speed, yaw rate, and lateral acceleration. This may be accomplished by implementing vehicle speed, yaw rate, and lateral acceleration sensors on the vehicle.

Figure 2:
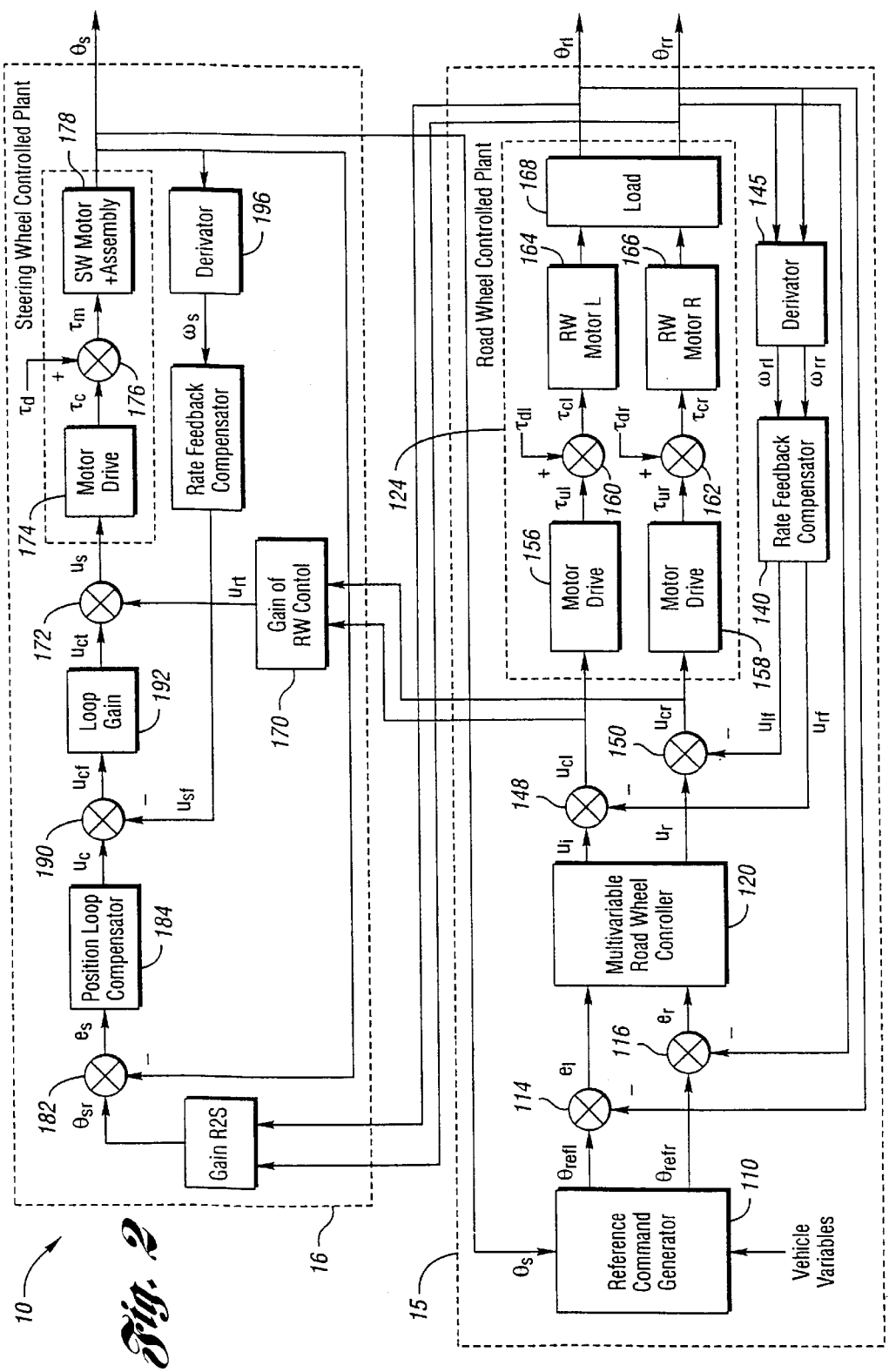
FIG. 2 is a block diagram of the steer-by-wire control system with the road wheel control sub-system and the steering wheel control sub-system.

FIG. 2 illustrates a block diagram of the steer-by-wire control system with the road wheel control sub-system 15 and the steering wheel control sub-system 16 in accordance with the present invention. The control system structure shown in FIG. 2, which is based on the steering system assembly shown in FIG. 1, describes components with blocks and variable relationship among control variables, input and output variables, and reference variables.

As shown in FIG. 2, road wheel sub-system 15 includes reference command generator 110 which receives a steering wheel angle signal $\theta_S$ and vehicle signals. Such vehicle signals may include vehicle speed, yaw rate, and lateral acceleration. The reference command generator 110 determines left and right road wheel reference angles $\theta_{refl}$, $\theta_{refr}$, wherein the generator 110 uses an algorithm based on the steering wheel angle signal and the vehicle signals. The left road wheel reference angle $\theta_{refl}$ is indicative of a desired left road wheel angular position and the right road wheel reference angle $\theta_{refr}$ is indicative of a desired right road wheel angular position. The road wheel reference angles $\theta_{refl}$ and $\theta_{refr}$, may be the same or different values.

The present invention introduces a road wheel servo feedback control to implement the tracking function of the actual road wheel angles to the desired road wheel reference angles $\theta_{refl}$ and $\theta_{refr}$. One reason for applying the servo feedback control is to obtain enough torque stuffiness to move the road wheels and to realize the required road wheel angle tracking accuracies with minimum tracking errors. The road wheel angles can track the road wheel reference angle and reject the effect of external disturbance torques when the external disturbance torques is less than servo system torque stuffiness. The common disturbance torques include road wheel tire/road friction, road surface disturbance, and wind gust. Thus, the steer-by-wire road wheel control system design becomes a servo control system design. Because the road wheel control sub-system has two inputs (left road wheel reference angle $\theta_{refl}$ and right road wheel reference angle $\theta_{refr}$), two outputs (The actual measured left wheel angle $\theta_{rl}$ and the measured right wheel angle $\theta_{rr}$) with a varying degree of road wheel angle coupling, the multivariable servo control for road wheel sub-system is applied.

Thus, as shown in FIG. 2, the multivariable servo feedback control steer-by-wire road wheel system 15 further includes a road wheel angular position feedback loop and an inner road wheel rate feedback loop. The road wheel angular position feedback loop is composed of road wheel controller 120 and road wheel controlled plant 124 based on the road wheel angular position feedback signals $\theta_{rl}$ and $\theta_{rr}$. The road wheel rate feedback loop is composed of the controlled plant 124 and road wheel rate feedback compensator 140 based on the road wheel angular rate feedback signal $\omega_{rl}$, and $\omega_{rr}$.

The road wheel controlled plant 124 is referred to the road wheel system assembly in the road wheel sub-system 15 between the input control signals $u_{cl}$, $u_{cr}$ of the motor drives 15a, 15b and output signals $\theta_{rl}$, $\theta_{rr}$ of the road wheel angles shown in FIG. 2. The road wheel sub-system assembly includes components depicted in FIG. 1 which include but are not limited to the road wheels, the motor amplifiers, the actuators, the road wheel angle sensors, and the tie rods.

As shown in FIG. 2, the road wheel rate feedback loop includes the controlled plant 124, the derivator 145 to generate road wheel angular rates from road wheel angles, and the road wheel rate feedback compensator 140. The road wheel rate feedback loop with the road wheel rate feedback compensator 140 utilizes the road wheel angular rate signals $\omega_{rl}$, and $\omega_{rr}$ to be feedback signals. The road wheel angle rate signals $\omega_{rl}$, $\omega_{rr}$ are obtained by a derivative operation 145 from left and right road wheel angles $\theta_{rl}$, $\omega_{rr}$. They can also be obtained from direct measurement using the road wheel angular rate sensors. As a part of road wheel servo control, the road wheel angle rate feedback loop improves the road wheel sub-system damping performance. More specifically, this is accomplished with the road wheel rate feedback compensator. The road wheel rate feedback loop can be regarded as a part of the road wheel controlled plant 124 in FIG. 2 when one considers the road wheel controller 120 design for the position loop.

FIG. 3 illustrates a schematic block diagram of the road wheel control sub-system 15 in FIG. 2. As shown, the road wheel sub-system 15 includes a reference command generator 110 and a multivariable servo feedback control system which is composed of multivariable road wheel controller 120 and road wheel controlled plant 124 based on the road wheel angular position feedback signals $\theta_{rl}$ and $\theta_{rr}$. The road wheel rate feedback loop has been absorbed to be a part of the road wheel controlled plant 124 in this figural illustration for the road wheel control sub-system 15.

As shown in FIGS. 2 and 3, signals of the left road wheel angle $\theta_{rl}$ and the right road wheel angle $\theta_{rr}$ are fed back to summers 114, 116 from subtract with the left and right road wheel reference angles $\theta_{refl}$, $\theta_{refr}$, respectively. The left road wheel angle summer 114 determines a left road wheel angle error $e_l$ between the left road wheel reference angle $\theta_{refl}$ and the left road wheel angle $\theta_{rl}$, wherein the left road wheel reference angle $\theta_{refl}$ is determined by the reference command generator 110. The right road wheel angle summer 116 determines a right road wheel angle error $e_r$ between the right road wheel reference angle $\theta_{refr}$ and an actual right road wheel angle $\theta_{rr}$, wherein the right road wheel reference angle $\theta_{refr}$ is determined by the reference command generator 110.

As shown in FIGS. 2 and 3, multivariable road wheel controller 120 receives left and right road wheel error signals $e_l$, $e_r$ from left and right angle summers 114, 116, and produces left and right road wheel control signals $u_l$ and $u_r$, respectively. Multivariable road wheel controller 120 is designed by using a multi-input multi-output (MIMO) decoupling control method so that each input variable of road wheel control sub-system in FIGS. 2 and 3, i.e., the left road wheel reference angle $\theta_{refl}$ and the right road wheel reference angle $\theta_{refr}$, each independently affects a corresponding output variable, i.e., the left road wheel angle $\theta_{rl}$ and the right road wheel angle $\theta_{rr}$. The decoupling control will be described in greater detail below.

More specifically, the multivariable road wheel controller 120 is implemented to produce a left road wheel control signal $u_l$ and a right road wheel control signal $u_r$. As described in greater detail below for the design of the multivariable road wheel controller 120, the left road wheel control signal $u_l$ is produced based on the left road wheel error signal $e_l$ and the right road wheel error signal $e_r$. Likewise, the right road wheel control signal $u_r$ is produced based on the right road wheel error signal $e_r$ and the left road wheel error signal $e_l$.

As shown in FIG. 3, the left road wheel control signal $u_l$ from the multivariable road wheel controller 120 then is sent to the controlled plant 124 for controlling the left road wheel angle $\theta_{rl}$ and right road wheel angle $\theta_{rr}$ such that the actual left wheel angle $\theta_{rl}$ independently tracks the left road wheel reference angle $\theta_{refl}$. Likewise, the right road wheel control signal $u_r$ from the multivariable road wheel control 120 is sent to the controlled plant 124 for controlling the actual right road wheel angle $\theta_{rr}$ and the left road wheel angle $\theta_{rl}$ such that the actual right wheel angle $\theta_{rr}$ independently tracks the right road wheel reference angle $\theta_{refr}$.

As shown in FIG. 2, left and right wheel control signals $u_l$, $u_r$ are summed with the road wheel rate feedback control signals $u_{lf}$, $u_{rf}$ produced by the rate feedback compensator in summers 148, 150, respectively. A left road wheel torque control signal $u_{cl}$ is determined based on the left road wheel control signal $u_l$ and rate feedback control signal $u_{lf}$ in summer 148. A right road wheel torque control signal $u_{cr}$ is determined based on the right road wheel control signal $u_r$ and rate feedback control signal $u_{rf}$ in summer 150. In this embodiment, as shown, the left and right road wheel rate feedback control signals $u_{lf}$, $u_{rf}$ are fed negatively back in a rate feedback loop to summers 148, 150, respectively.

As shown in FIG. 2, road wheel controlled plant 124 is depicted in road wheel sub-system 15 having left and right motor drives 156, 158. The left and right motor drives 156, 158 receive left and right wheel torque control signals $u_{cl}$, $u_{cr}$, respectively, for determining a left road wheel motor drive output torque $\tau_{ul}$ and a right road wheel motor drive output torque $\tau_{ur}$.

In this invention, external disturbances on the road wheels are represented by equivalent disturbance torques $\tau_{dl}$ and $\tau_{dr}$ in FIG. 2. As shown, equivalent left and right road wheel disturbance torques $\tau_{dl}$ and $\tau_{dr}$ are exerted on the road wheel controlled plant 124 in summers 160, 162. The left road wheel disturbance torque $\tau_{dl}$ represents the influence of all disturbances in the road wheel sub-system to the left road wheel motor drive output torque $\tau_{ul}$ by adding $\tau_{dl}$ on summer 160. An effective torque control signal $\tau_{cl}$ for the left road wheel is produced in the output of summer 160. The right road wheel disturbance torque $\tau_{dr}$ represents the influence of all disturbances in the road wheel sub-system to the right road wheel motor drive output torque $\tau_{ur}$ by adding $\tau_{dr}$ on summer 162. An effective torque control signal $\tau_{cr}$ to the left road wheel is produced in the output of summer 162.

As shown in FIG. 2, the effective torque control signal $\tau_{cl}$ to the left road wheel is inputted to a left road wheel motor 164 which generates a corresponding amount of torque on load 168 to affect a road wheel angle change on the left and right road wheels. As shown, the effective torque control signal $\tau_{cr}$ to the right road wheel is inputted to a right road wheel motor 166 which generates a corresponding amount of torque on load 168 to affect a road wheel angle change on the right and left road wheels. Load 168 represents the road wheels and the assembly thereof, road wheel sensors, and effects of the vehicle dynamics.

FIG. 2 further illustrates steering wheel sub-system 16 which provides the steering wheel reference angle $\theta_s$ to the road wheel sub-system and produces an appropriate steering feel for the vehicle driver. These steering functions of steering wheel system can be accomplished by using the feedback control structure of 16 shown in FIG. 2. As shown, there are three feedback loops in the steering wheel control sub-system 16 including the inner torque loop, steering wheel rate feedback loop, and steering wheel position feedback loop based on the equivalent road wheel torque signal $u_{rt}$, steering wheel rate signal $\omega_s$ and steering wheel angle signal $\theta_s$, respectively.

In this invention, a driver's action to turn the steering wheel is regarded as an equivalent external disturbance torque $\tau_d$ in the steering wheel control sub-system 16. The steering wheel control sub-system 16 with the torque, rate and position feedbacks is designed with the disturbance torque rejection function under the requirements of system stability and performances. When an external disturbance torque $\tau_d$ which represents the driver's steering action is exerted to such a feedback control system, the steering wheel control sub-system 16 will produce a reaction torque $\tau_c$ to reject the equivalent disturbance torque $\tau_d$. Thus, a driver holding the steering wheel of the vehicle will feel the reaction torque change in the process of turning the steering wheel. By automatically adjusting parameters of the steering wheel feedback controller in steering wheel control sub-system 16 related with vehicle variables, e.g., vehicle speed, the reaction torque will change with the vehicle variables and steering feedback variables (the steering wheel angle, steering wheel rate and road wheel torque). As a result, the steering wheel control sub-system 16 can produce a variable steering feel by generating the required variable reaction torque as feedback to the driver's action.

The torque feedback signal in the inner torque loop of the steering wheel control sub-system comes from the road wheel torque estimation signal. As shown in FIG. 2, left and right road wheel control signals $u_l$, $u_r$ in road wheel control sub-system 15 are utilized to produce an equivalent road wheel torque signal $u_{rt}$ in the output of the road wheel control gain 170. In other words, the road wheel torque estimation signal $u_{rt}$ can be obtained from the control signals of the road wheel feedback control system. The equivalent road wheel torque signal $u_{rt}$ is proportional to the road wheel control signals. The equivalent road wheel torque signal $u_{rt}$ may change according to the road wheel system operating conditions, external disturbances and the road conditions. This signal provides a low cost, low noise and high quality road wheel torque signal without the need for a direct road wheel torque sensor measurement.

As shown in FIG. 2, equivalent road wheel torque signal $u_{rt}$ is fed to summer 172 in the steering wheel control sub-system which determines steering motor drive control signal $u_s$. As shown, the steering wheel motor drive 174 receives the steering motor drive control signal $u_s$ and produces the reaction torque $\tau_c$ using the steering motor 178 connected with the steering wheel. The reaction torque $\tau_c$ is proportional to the equivalent driver disturbance torque $\tau_d$. This relationship is represented on summer 176 with output of effective torque signal $\tau_m$. The effective torque signal $\tau_m$ represents the difference between equivalent driver disturbance torque $\tau_d$ and reaction torque $\tau_c$. It should be noted that the steering wheel is being turned when $\tau_m$ is in a positive or negative value, and steering wheel is being stopped when $\tau_m$ is in zero value. The effective torque $\tau_m$ also affects the steering wheel angle change when the equivalent driver disturbance torque $\tau_d$ changes.

The steering wheel rate signal $\omega_s$ is obtained from a derivative operation in block 196 of the steering wheel angle $\theta_s$ and is received by a rate feedback compensator 171. The output control signal of rate feedback compensator 171 is fed negatively to summer 190 to form the rate feedback loop. A control signal $u_{cf}$ is determined in the summer 190 which calculates the difference between a steering wheel torque control signal $u_c$ from position loop compensator 184 and a feedback control signal $u_{sf}$ from the rate feedback loop compensator 171. An amplified control signal $u_{ct}$ in the output of loop gain 192 is used to obtain the motor drive control signal $u_s$ on summer 172 based on the equivalent torque feedback signal $u_{rt}$. The function of rate feedback loop is to produce the adjustable steering wheel return rate by cooperating with the inner torque feedback loop and the steering wheel angular position feedback loop. When the driver releases the steering wheel, the steering wheel will return to the center or to a certain angle with an adjustable rate.

FIG. 2 further illustrates that a steering wheel reference angle $\theta_{sr}$ is determined by gain R2S based on the left and right road wheel angles $\theta_{rl}$, $\theta_{rr}$. As shown, a steering wheel position error signal $e_s$ is obtained based on the steering wheel reference angle $\theta_{sr}$ and a steering wheel angle $\theta_s$ in summer 182. The position loop compensator 184 receives the steering wheel position error $e_s$ and determines the steering wheel control signal $u_c$. In this embodiment, the steering wheel angle $\theta_s$ is fed to summer 182 to form the position feedback loop.

The reaction torque $\tau_c$ may be adjusted by changing parameters of the position loop compensator 184, loop gain 192, and gain of road wheel control signal 170. In a situation of a parameter change in the compensator and gains, the vehicle driver will experience a steering wheel feel change due to the reaction torque $\tau_c$ change. In order to implement the parameter automatic adjustment in the steering wheel control sub-system such that the variable steering feel can be obtained based on the reaction torque $\tau_c$ change, vehicle signals related with the steering feel, such as the vehicle speed, are introduced as the scheduling signals to adjust parameters automatically.

FIG. 4 depicts a block diagram of a multivariable road wheel servo feedback control system with the multivariable road wheel controller 120 and the road wheel controlled plant 124 shown in FIG. 3. Road wheel controlled plant 124 has been described using blocks and transfer functions which mathematically describe a system between output variables and input variables in a complex plane, s. A coupling effect between output variables and input variables can be clearly described using FIG. 4. The input variables of the controlled plant 124 in FIG. 4 are two control signals $u_l$, $u_r$. The output variables are two actual road wheel angle signals $\theta_{rl}$, $\theta_{rr}$.

A nominal model of the controlled road wheel plant 124 between input variables $u_l$, $u_r$ and output variables $\theta_{rl}$, $\theta_{rr}$ may be given by using transfer function matrix description as follows:

$$\begin{bmatrix}\theta_{rl}\\ \theta_{rr}\end{bmatrix} = \begin{bmatrix}G_{ll}(s) & G_{rl}(s)\\ G_{lr}(s) & G_{rr}(s)\end{bmatrix}\begin{bmatrix}u_l\\ u_r\end{bmatrix} \qquad (1)$$

wherein $\theta_{rl}$ is indicative of the actual left road wheel angle, $\theta_{rr}$ is indicative of the actual right road wheel angle, $u_l$ is indicative of the left road wheel torque control signal, and $u_r$ is indicative of the right road wheel torque control signal. Moreover, $G_{ll}$ is indicative of a transfer function between the actual left road wheel angle output $\theta_{rl}$ and the left road wheel torque control signal input $u_l$, $G_{lr}$ is indicative of a transfer function between the actual left road wheel angle output $\theta_{rl}$ and the left road wheel torque control signal input $u_r$, $G_{lr}$ is indicative of a transfer function between the actual right road wheel angle output $\theta_{rr}$ and the left road wheel torque control signal input $u_l$, and $G_{rr}$ is indicative of a transfer function between the actual right road wheel angle output $\theta_{rl}$ and the right road wheel torque control signal input $u_r$.

According to the nominal model of the controlled road wheel plant shown in Equation (1), any change in any one of the input variables may cause changes in each of the output variables due to a coupling influence when the controlled road wheel plant is not controlled by multivariable road wheel controller 120. Equation (1) may be re-written as: $\theta_{rl}=G_{ll}(s)u_l+G_{rl}(s)u_r$ and $\theta_{rr}=G_{lr}(s)u_l+G_{rr}(s)u_r$. It will be noted that $\theta_{rl}$ and $\theta_{rr}$ will change if $u_l$ changes and when $u_r$ is constant. Moreover, $\theta_{rl}$ and $\theta_{rr}$ will change if $u_r$ changes and when $u_l$ stays constant. Transfer functions $G_{lr}$ and $G_{rl}$ represent the coupling influence.

Unavoidable uncertain perturbations are caused by variations in road conditions, vehicle dynamics and road wheel sub-system assembly. A realistic model of the controlled plant will consider perturbation bound around the nominal model described in Equation (1). Thus, a transfer function matrix for the actual multivariable road wheel controlled plant 124 is described by $G(s)=G_0(s)(I+\Delta G(s))$, where $G_0(s)$ is the nominal transfer function in Equation (1), $\Delta G(s)$ represents a bound function of the uncertainty, and 1 is an identity matrix. The actual nonlinear model of the road wheel controlled plant 124 can be represented in different operating points such that several nominal models in the form of equation (1) can be determined.

The multivariable road wheel controller 120 is designed to implement the road wheel angle tracking function (discussed above). Multivariable decoupling algorithms can be applied to "decouple" or eliminate the effects of loop interactions, which result in multiple dependent output variables in the road wheel controlled plant 124. The multivariable road wheel controller 120 can decompose the multivariable road wheel servo control system into a series of independent single-loop sub-systems such that each road wheel angle $\theta_{rl}$ or $\theta_{rr}$ independently tracks each road wheel reference angle $\theta_{refl}$ or $\theta_{refr}$, respectively.

As shown in FIG. 4, input variables of multivariable road wheel controller 120 are left and right road wheel error signals $e_l$, $e_r$. The output variables are left and right control signals $u_l$, $u_r$. The relationship between the inputs and outputs may be described by using a transfer function matrix as follows:

$$\begin{bmatrix} u_l \\ u_r \end{bmatrix} = \begin{bmatrix} C_{ll}(s) & C_{rl}(s) \\ C_{lr}(s) & C_{rr}(s) \end{bmatrix} \begin{bmatrix} e_l \\ e_r \end{bmatrix} \qquad (2)$$

each element of the multivariable road wheel controller 120 in Equation (2) is given as follows: $C_{ll}$ is a transfer function between left road wheel torque control signal output $u_l$ and left road wheel error signal $e_l$, $C_{rl}$ is a transfer function between left road wheel torque control signal output $u_l$ and right road wheel error signal $e_r$, $C_{lr}$ is a transfer function between right road wheel torque control signal output $u_r$ and left road wheel error signal $e_l$, $C_{rr}$ is a transfer function between right road wheel torque control signal output $u_r$ and right road wheel error signal $e_r$.

According to the multivariable road wheel controller described in Equation (2), any change in any one of the input error variables causes changes in each of the output control variables to achieve the goal to decouple the coupling influence in the multivariable road wheel controlled plant 124. Moreover, Equation (2) can be re-written as: $u_l = C_{ll}(s) e_l + C_{rl}(s) e_r$ and $u_r = C_{lr}(s) e_l + C_{rr}(s) e_r$. It is to be noted that $u_l$ and $u_r$ will change if $e_l$ changes and when $e_r$ stays constant, and $u_l$ and $u_r$ will also change if $e_r$ changes when $e_l$ stays constant. Transfer functions $C_{lr}$ and $C_{rl}$ represent a decoupling term and, in turn, reduce or eliminate the coupling influence of coupling which is described by $G_{lr}$ and $G_{rl}$ in Equation (1).

Figure 5:
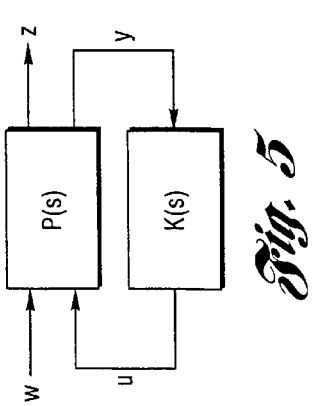
FIG. 5 is a block diagram of a general multivariable feedback control system which may be used in accordance with the present invention.

The multivariable road wheel control system design can be described in a standard problem framework. The standard problem block diagram for the multivariable control system design is shown in FIG. 5, where P(s) is an augmented plant including a nominal controlled plant and weighting functions of a control system. K(s) is a controller which is designed. Signals are described as follows: u is a control variable, y is a measured variable, w is an exogenous signal, and z is a control objective. The standard problem in FIG. 5 may be described as follows:

$$\begin{bmatrix} z \\ y \end{bmatrix} = \begin{bmatrix} P_{11} & P_{12} \\ P_{21} & P_{22} \end{bmatrix} \begin{bmatrix} w \\ u \end{bmatrix}, \qquad (3)$$

$$u = Ky. \qquad (4)$$

A closed-loop transfer function matrix from w to z may be given by:

$$F_{wz}(s) = P_{11}(s) + P_{12}(s) K(s) (I - P_{22}(s) K(s))^{-1} P_{21}(s) \qquad (5)$$

As an example of the multivariable road wheel control system in accordance with the present invention, a multivariable $H_\infty$ control application is described. The $H_\infty$ control takes a worst-case effect of a model uncertainty into consideration and can implement a multivariable feedback system design that is robust with respect to model uncertainties and disturbances. It can be applied to solve the design problem of the multivariable servo control system with the variable decoupling. Since the objectives here are the road wheel reference angle tracking and stability robustness control under uncertainty, the controller K(s) is synthesized by minimizing a norm of a weighted combination of sensitivity and complementary sensitivity transfer functions discussed below.

Considering the road wheel servo control system shown in FIG. 4, sensitivity and complementary sensitivity transfer function matrices may be defined as follows:

$$S(s) = (I + G(s) K(s))^{-1}. \qquad (6)$$

$$T(s) = G(s) K(s) (I + G(s) K(s))^{-1} = (I - S(s)) \qquad (7)$$

The singular values $\bar{\tau}(S)$ of sensitivity function matrix S(s) determine the disturbance attenuation performance based on $\bar{\tau}(S) \leq \bar{\tau}(W_1^{-1})$ where $W_1^{-1}$ is the desired disturbance attenuation factor. The singular values $\bar{\tau}(T)$ of complementary sensitivity transfer function matrix T(s) is the measurement of the robust stability of multivariable road wheel feedback system based on $\bar{\tau}(S) \leq \bar{\tau}(W_2^{-1})$ where $W_2^{-1}$ is the largest anticipated multiplicative plant perturbation. The requirements of the control system performances and control system robust stability including the variable decoupling can be specified by weighting functions $W_1(s)$ and $W_2(s)$ within a framework of the standard problem shown in FIG. 6. Therefore, the closed-loop transfer function matrix from w to z considering such requirements can be described as follows:

$$F_{zw}(s) = \begin{bmatrix} W_1^{-1}(s) S(s) \\ W_2^{-1}(s)(I - S(s)) \end{bmatrix} \qquad (8)$$

Equation (8) is a more specific form of Equation (5). A standard $H_\infty$ control problem can be stated as finding K(s) to satisfy $$\|F_{zw}(s)\|_\infty \leq 1 \qquad (9)$$

under the condition that the closed-loop system is stable, where $\|F_{zw}(s)\|$ denotes the $H_\infty$ norm of matrix $F_{zw}(s)$. By the suitable choice for the weighting functions $W_1(s)$ and $W_2(s)$, the $H_\infty$ controller can be designed to satisfy the criterion (9) such that road wheel servo control system is robust stable with required performances.

As it has been mentioned above, dynamics of the road wheel controlled plant 124 changes with road conditions, vehicle dynamics, and road wheel system assembly itself. Moreover, gain of the road wheel controlled plant 124 dynamics changes substantially with vehicle speed. Therefore, the road wheel controlled plant is nonlinear. The gain scheduling strategy is an effective way of controlling systems whose dynamics change with operating conditions. This strategy is typically used to control nonlinear plants where a relationship between plant dynamics and operating conditions are known. In this invention, a gain scheduling control strategy is implemented to satisfy tracking and decoupling performances of the road wheel servo control system.

In order to apply gain scheduling control, the several nominal models of the road wheel controlled plant 124 shown in FIG. 4 and Equation (1) under the different vehicle speeds need to be determined. Thus, the change of gain of road wheel controlled plant 124 is described quantitatively by using the nominal models in the different operating points. Each corresponding multivariable road wheel controller in the different operating point can be designed using the above-mentioned method based on each nominal model. In this embodiment, gain of the multivariable controller 120 changes automatically with vehicle speed to properly compensate a gain change of the controlled road wheel controller plant 124.

Figure 6:
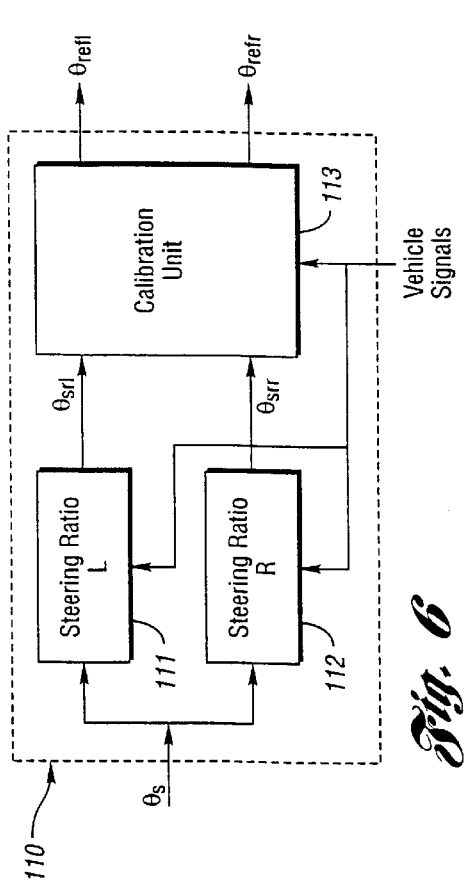
FIG. 6 is a block diagram of an example of a reference command generator of the road wheel sub-system for the steer-by-wire system in FIG. 1.

FIG. 6 depicts a block diagram of the reference command generator 110 shown in FIG. 2 and FIG. 3. Generator 110 has one input, the steering wheel angle $\theta_s$, and two outputs, left and right road wheel reference angles $\theta_{refl}$, $\theta_{refr}$. As shown in FIG. 6, there are two stages to produce outputs the left and right road wheel reference angles $\theta_{refl}$, $\theta_{refr}$ from the input steering wheel angle $\theta_s$. In a first stage, reference command generator 110 produces left and right road wheel angles $\theta_{srl}$, $\theta_{srr}$ from steering wheel angle signal $\theta_s$. This can be accomplished by using steering ratio gain blocks 111, 112 for each corresponding road wheel angle. A proportional value between the steering wheel angle and each road wheel angle may be termed as steering ratio. Left and right steering ratio gains L and R in the FIG. 6 can be set up to be different in gain blocks 111 and 112 for the same one steering wheel angle $\theta_s$ input according to vehicle handling performance requirements. In this embodiment, output left and right road wheel angles $\theta_{srl}$, $\theta_{srr}$ will be different because different steering ratio gains L and R for same one input steering wheel angle $\theta_s$.

To improve steering performance, a variable steering ratio can be implemented by using vehicle speed as a scheduling signal to change the steering ratio gains L and R shown in FIG. 6. Typically, steering ratio is larger at high speeds (about 40–90 mph) and is smaller at low speeds (about 0–40 mph). However, any steering ratio may be used at low and high speeds without falling beyond the scope or spirit of the present invention.

In a second stage, the reference command generator 110 further implements a calibration for left and right road wheel angles $\theta_{srl}$, $\theta_{srr}$ in a calibration unit 113. This is performed according to vehicle geometry and steering performance requirements. As shown, output signals of calibration unit 113 are the left and right road wheel reference angles $\theta_{refl}$, $\theta_{refr}$. As an example, an Ackerman Angle, or Ackerman geometry, can be implemented to generate the required left and right road wheel reference angles $\theta_{refl}$, $\theta_{refr}$ in calibration unit 113. In this embodiment, Ackerman Angle is referred to as an average angle of the front road wheels of the vehicle. An optimized Ackerman geometry in the road wheel angles during turning can significantly reduce front tire wear. Moreover, the correct road wheel angles are also related to vehicle dynamics to improve the vehicle's handling performance. Thus, left and right road wheel reference angles $\theta_{refl}$, $\theta_{refr}$ can be obtained in real time by using vehicle variables such as vehicle speed, yaw rate, and lateral acceleration in calibration unit 113. Furthermore, these road wheel reference angles $\theta_{refl}$, $\theta_{refr}$ can be completely tracked by the actual road wheel angles $\theta_{rl}$, $\theta_{rr}$ because the road wheel feedback control sub-system in FIG. 3 has been designed as a servo control system with the reference input signal tracking function discussed above.

In this embodiment, some functions of the reference command generator 110 are to receive a steering wheel angle and some vehicle variables from the steering wheel sub-system 15 shown in FIG. 3 and the vehicle to produce separate left and right road wheel reference angles. Within the reference command generator 110, two road wheel angle reference signals are obtained from the steering wheel angle in real-time according to steering ratio gain blocks 111, 112 and calibration unit 113. This is accomplished by using vehicle variables, e.g. vehicle speed, yaw rate, and lateral acceleration, which may be sensed by any suitable means known in the art.

Figure 7:
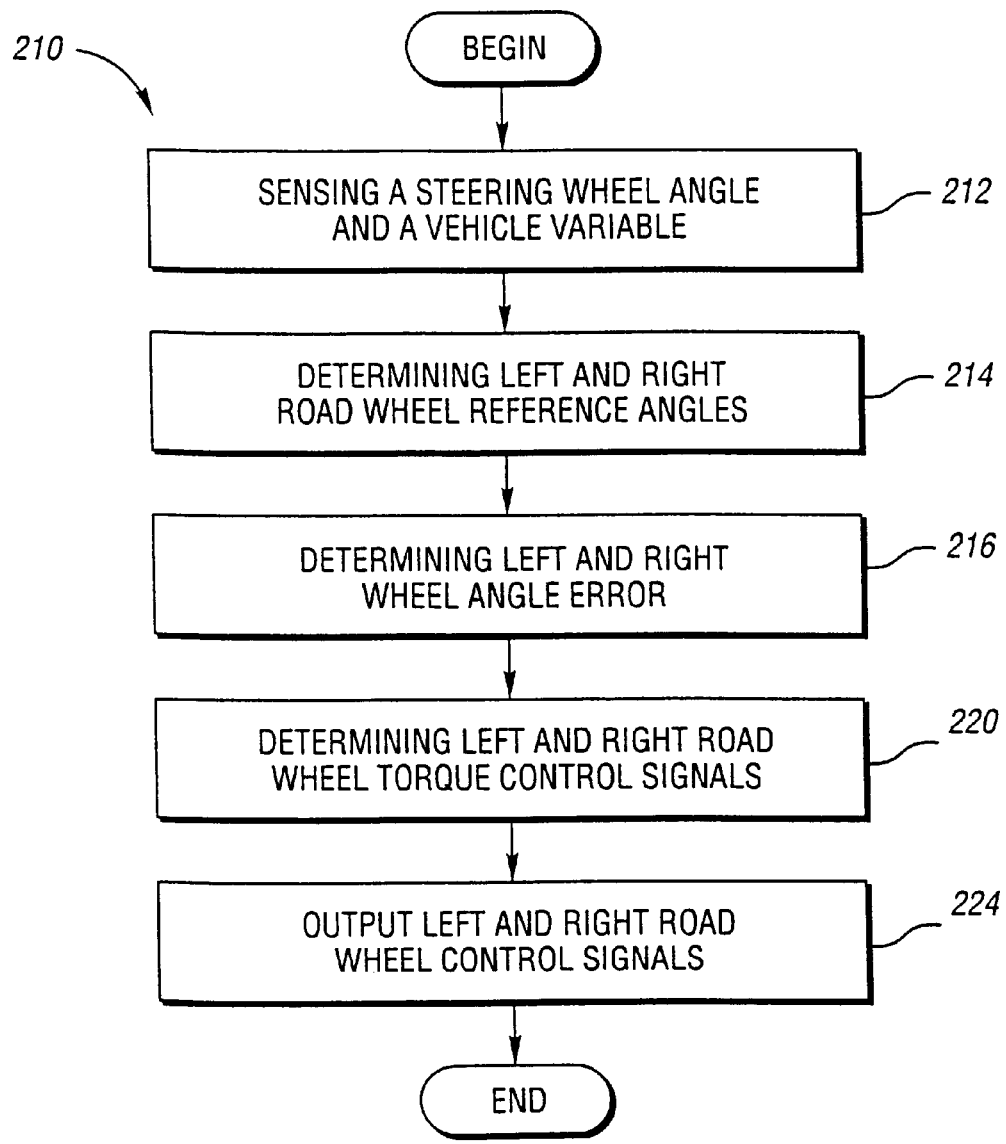
FIG. 7 is a flowchart of one general method of independently controlling left and right road wheels of the vehicle in accordance with the present invention.

FIG. 7 is a flowchart illustrating one general method 210 of road wheel sub-system control in the present invention. The method 210 depicts general routine procedure to be performed during operation of the steer-by-wire road wheel control system –15 of FIG. 2. As shown, method 210 is performed to produce control variables $u_l$, $u_r$ for independently controlling left and right road wheel angles $\theta_{rl}$ and $\theta_{rr}$ to track road wheel reference angles $\theta_{refl}$ and $\theta_{refr}$.

The method comprises sensing a steering wheel angle and a vehicle variable in box 212, determining left and right road wheel reference angles based on the steering wheel angle and the vehicle variable in box 214, determining left and right road wheel errors between the left and right road wheel reference angles and an actual left and right road wheel angles respectively in box 216. The method further comprises determining left and right road wheel control signals in box 220. The left and right wheel control signals are based on the left and right road wheel errors and are determined by the multivariable servo control algorithm with the decoupling feature. The method further comprises outputs of left and right control signals to the road wheel controlled plant in box 224.

Figure 8:
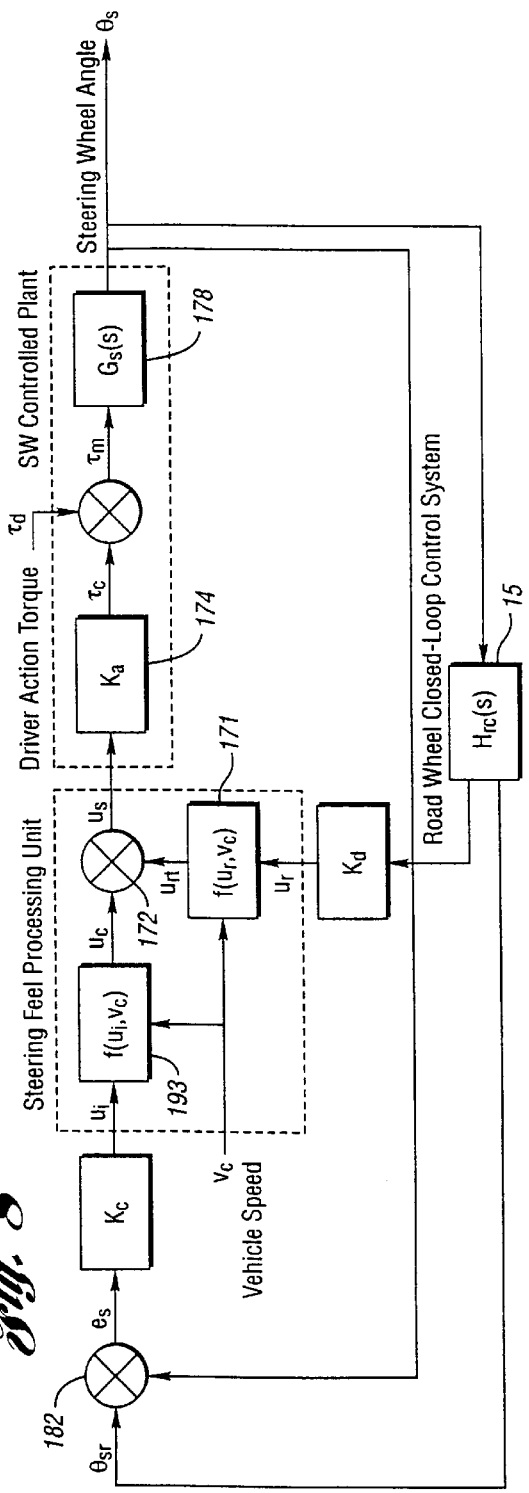
FIG. 8 is a simplified block diagram of the steer-by-wire control system in FIG. 2.

Steer-by-wire control system 11 of the present invention shown in FIG. 2 provides a steering feel for the driver. As mentioned above, this is accomplished by using the feedback control for steering wheel sub-system having a plurality of loops as shown in FIG. 2. Thus, the requirement to obtain the desired steering feel becomes the requirement for design of the steer-by-wire control system. To design the steer-by-wire control system with the required steering feel, it is significant to describe the steering feel as a specification in the control system. Therefore, the quantitative description for the steering feel based on the steer-by-wire control system shown in FIG. 2 is developed in this invention and described in below, The steering feel varies normally with the steering wheel angle, road wheel torque, and vehicle speed. Therefore, the quantitative description for the steering feel may be obtained by establishing the relationship of the steering wheel reaction torque and the steering wheel angle, road wheel torque, and vehicle speed. In order to establish such relationship, a block diagram of the steer-by-wire control system 11 including steering wheel control sub-system 16 and road wheel control sub-system 15 of FIG. 2 is re-depicted in FIG. 8. It is noted that the steering wheel rate feedback loop in FIG. 2 is regarded as a part of steering wheel controlled plant which is represented using transfer function description $G_s(s)$. The road wheel control sub-system with the servo feedback is represented as a block with the transfer function description $H_r(s)$. In FIG. 8, $\tau_d$ represents an equivalent disturbance torque exerted by the vehicle's driver and $\tau_c$ represents a reaction torque from the steering wheel control sub-system. The reaction torque $\tau_c$ is applied on the steering wheel at a direction opposite equivalent disturbance torque $\tau_d$, providing a familiar steering wheel feel to the driver. Moreover, an effective torque $\tau_m$ represents a difference between the reaction torque $\tau_c$ and the equivalent disturbance torque $\tau_d$. This may be described as follows:

$$\tau_m = \tau_d - \tau_c \tag{10}$$

As shown in FIG. 8, the angular position compensator in FIG. 2 is represented by using a constant gain K, and a function $f(u_r(t), v_c)$ 171 which is related with its input variable $u_r(t)$ and vehicle speed $V_s$. The road wheel torque estimator in FIG. 2 is represented by using a constant gain $K_d$ and a function $f(u_r(t), v_c)$ 193 is related with its input variable $u_d(t)$ and vehicle speed $V_s$. The control variable $u_s(t)$ is proportional to the reaction torque $\tau_c$ with the linear gain Ka. Thus $u_s(t)$ may be considered as an equivalent reaction torque variable which is affected by the input variable $u_t(t)$ of function 193 and the input variable $u_r(t)$ of function 171. It is assumed the road wheel angles are proportional to the steering wheel angle $\theta_s$ with fixed or variable steering wheel ratio. As shown in FIG. 8, input variable $u_r(t)$ of function 193 is proportional to the steering wheel angle $\theta_s$. The input variable $u_r(t)$ of function 171 is proportional to the equivalent road wheel torque $\tau_d$. Shown below, Table 1 lists variables within the steering wheel control unit and steer-by-wire control system.

TABLE 1

Variable Relations

| Steering wheel control unit | Steer-by-wire control system |
|---|---|
| $u_s$ (t) | Reaction torque $\tau_c$ (t) |
| $u_l$ (t) | Steering wheel angle $\theta_s$ |
| $u_r$ (t) | Road wheel torque $\tau_{rc}$ |

It is one purpose to obtain a quantitative description for reaction toque $\tau_c(t)$ based on steering wheel angle $\theta_s$, road wheel torque $\tau_r$, and vehicle speed $V_s$ in the present invention. From the variable relationships between the steer-by-wire system and the steering wheel control unit, steering wheel control unit variables $u_s(t)$, $u_l(t)$ and $u_r(t)$ can be used to describe steer-by-wire system variables, including reaction toque $\tau_c(t)$, steering wheel angle $\theta_s$ and road wheel torque $\tau_r$, as shown in table 1.

A non-linear equation is derived in the steering wheel control unit shown in FIG. 8 to provide a description of the equivalent reaction torque $u_s(t)$ as follows:

$$u_s(t) = f(u_l(t), v_c) u_l + f(u_r(t), v_c) u_r \quad (11)$$

There are two items in (11): the first item gives the relationships between $u_s(t)$ and $u_l(t)$ using function $f(u_l(t), v_c)$, the second item gives the relationships between $u_s(t)$ and $u_r(t)$ using function $f(u_r(t), v_c)$. Each function of $f(u_l(t), v_c)$ and $f(u_r(t), v_c)$ is a function of vehicle speed $V_c$. Both of them may be linear or nonlinear functions of input variables $u_l(t)$, $u_r(t)$ and vehicle speed. By adjusting the parameters of two functions $f(u_l(t), v_c)$ and $f(u_r(t), v_c)$, the equivalent reaction torque $u_s(t)$ will change with variable $u_l(t)$ and $u_r(t)$. The change of vehicle speed $V_c$ will automatically adjust the parameters of the functions $f(u_l(t), v_c)$ and $f(u_r(t), v_c)$ to cause the change of function values such that the equivalent reaction torque $u_s(t)$ produces the relative changes.

Equation (11) is an analytical description for the equivalent reaction torque $u_s(t)$. If $f(u_l(t), v_c)$ and $f(u_r(t), v_c)$ are linear functions, the equivalent reaction torque $u_s(t)$ will change with input variable $u_l(t)$, $u_r(t)$ and vehicle speed $V_c$ linearly. If $f(u_l(t), v_c)$ and $f(u_r(t), v_c)$ are non-linear functions, the equivalent reaction torque $u_s(t)$ will change with input variable $u_l(t)$, $u_r(t)$ and vehicle speed $V_c$ non-linearly. The functions $f(u_l(t), v_c)$ and $f(u_r(t), v_c)$ determine the equivalent reaction torque.

As a special example, functions $f(u_l(t), v_c)$ and $f(u_r(t), v_c)$ may be speed-independent constants and may be expressed as Ki and Kr. Then, equation (11) to describe the equivalent reaction torque is given as $u_s(t) = K_c u_l + K_r u_r$. It is a linear function which indicates the equivalent reaction torque $u_s(t)$ changing with input variable $u_l(t)$, $u_r(t)$ linearly.

According to the variable relations between steering wheel control unit and steering wheel control system shown in Table 1, a related non-linear equation to describe the reaction torque $\tau_c$ may be further provided as follows:

$$\tau_r = k_1 f(u_l(t), v_c(t)) \theta_s + k_2 f(u_r(t), v_c) \tau_r \quad (12)$$

where $k_1$ is the proportional constants between $u_l$ and the steering wheel angle $\theta_s$, and $k_2$ is proportional constants between $u_r$ and the road wheel torque $\tau_r$, respectively. The Equation (12) gives the quantitative description for reaction toque $\tau_c(t)$ based on steering wheel angle $\theta_s$, road wheel torque $\tau_r$ and vehicle speed $V_s$.

In this embodiment, $f(u_l(t), v_c)$ and $f(u_r(t), v_c)$ in Equations (11) and (12) can be determined analytically by the desired reaction torque in the steering wheel control system design. Typically, the steering feel is evaluated with curves of the steering wheel torque vs. steering wheel angle, or curves of steering wheel torque vs. road wheel torque. These expected curves may be determined using analytic function $f(u_l(t), v_c)$ and $f(u_r(t), v_c)$ in equations (11) and (12) with steering wheel control system design. As a result, the steer-by-wire system generates the desired steering feel because the desired reaction torque, as a control system performance specification, has been considered in the stage of control system design.

In this embodiment, the steering feel may be adjusted and controlled by varying the parameters of functions $f(u_l(t), v_c)$ and $f(u_r(t), v_c)$. As a result, the steer-by-wire control system may provide adjustable steering feel by generating reaction torque $\tau_c$ quantitatively.

Further aspects, features and advantages of the invention will become apparent from consideration of the following erudite description and the appended claims when taken in connection with the accompanying drawings.

What is claimed is:

1. A method of controlling a vehicle steer-by-wire system having two independent road wheels, the method comprising:

providing a steering wheel control sub-system to generate road wheel reference angles and to produce steering feel for a vehicle driver;

providing a road wheel control sub-system including a multivariable road wheel controlled plant and a multivariable road wheel controller for controlling actual road wheel angles to track to road wheel reference angles within a servo control system structure having road wheel angular position feedback and road wheel angular rate feedback loops;

modeling the multivariable road wheel controlled plant as $$\begin{bmatrix} \theta_{rl} \\ \theta_{rr} \end{bmatrix} = \begin{bmatrix} G_{ll}(s) & G_{rl}(s) \\ G_{lr}(s) & G_{rr}(s) \end{bmatrix} \begin{bmatrix} u_l \\ u_r \end{bmatrix},$$

wherein $\theta_{rl}$ is indicative of the left road wheel angle, $\theta_{rr}$ is indicative of the right road wheel angle, $u_l$ is indicative of the left road wheel torque control variable, $u_r$ is indicative of the right road wheel torque control variable, $G_{ll}(s)$ is indicative of a first plant transfer function between $\theta_{rl}$ and $u_l$, $G_{lr}(s)$ is indicative of a second plant transfer function between $\theta_{rr}$ and $u_l$, $G_{rl}(s)$ is indicative of a third plant transfer function between $\theta_{rl}$ and $u_r$, and $G_{rr}(s)$ is indicative of a fourth plant transfer function between $\theta_{rr}$ and $u_r$;

implementing the multivariable road wheel controller as $$\begin{bmatrix} u_l \\ u_r \end{bmatrix} = \begin{bmatrix} C_{ll}(s) & C_{rl}(s) \\ C_{lr}(s) & C_{rr}(s) \end{bmatrix} \begin{bmatrix} e_l \\ e_r \end{bmatrix},$$

wherein $u_l$ is indicative of the left road wheel torque control variable, $u_r$ is indicative of the right road wheel torque control variable, $e_l$ is indicative of the left road wheel angle error, $e_r$ is indicative of the right road wheel angle error, $C_{ll}(s)$ is indicative of a first controller transfer function between $u_l$ and $e_l$, $C_{lr}(s)$ is indicative of a second controller transfer function between $u_r$ and $e_l$, $C_{rl}(s)$ is indicative of a third controller transfer function between $u_l$ and $e_r$, and $C_{rr}(s)$ is indicative of a fourth controller transfer function between $u_r$ and $e_r$, applying road wheel angles and angular rates as feedback signals to construct a servo control system with the multivariable controlled plant and the multivariable road wheel controller to implement the left and right road wheel angles tracking for left and right road wheel reference angles;

receiving left and right road wheel reference angles being based on the steering wheel angle command from the steering wheel control sub-system;

receiving the left and right road wheel angles from the multivariable road wheel controlled plant;

calculating the left and right road wheel angle errors based on the left and right road wheel angles and left and right road wheel reference angles;

generating the left and right road wheel torque control variables from the multivariable road wheel controller with servo control performances based on the left and right road wheel angle errors; and applying torque control variables of the multivariable road wheel controller to the multivariable controlled plant to control tracking of the actual left and right wheel angles with the left and right road wheel reference angles, respectively.

2. The method of claim 1 wherein calculating the left and right road wheel angle errors includes:

determining the left road wheel angle error between the left road wheel reference angle and the actual received left road wheel angle by using the left road wheel angle negative feedback; and determining the right road wheel angle error between the right road wheel reference angle and the actual received right road wheel angle by using the left road wheel angle negative feedback.

3. The method of claim 1 wherein generating the left and right road wheel torque control variables includes:

determining the left road wheel torque control variable based on the left road wheel angle error and the right road wheel angle error using the multivariable road wheel controller in the road wheel servo control system; and determining the right road wheel torque control variable based on the right road wheel angle error and the left road wheel angle error using the multivariable road wheel controller in the road wheel servo control system.

4. The method of claim 1 further comprising:

applying actuation torque to the left road wheel based on the left road wheel torque control variable of the road wheel servo control system to independently control the actual left wheel angle and to track the left road wheel reference angle; and applying actuation torque to the right road wheel based on the right road wheel torque control variable of the road wheel servo control system to independently control the actual right wheel angle and to track the right road wheel reference angle.

5. The method of claim 1 further comprising:

minimizing the left road wheel angle error between the actual left road wheel angle and left road wheel reference angle;

minimizing the right road wheel angle error between the actual right road wheel angle and right road wheel reference angle;

controlling actual left road wheel angle with quick time response for the left road wheel reference angle;

controlling actual right road wheel angle with quick time response for the right road wheel reference angle;

providing maximum servo stiffness to overcome the external disturbance torques in the left road wheel; and providing maximum servo stiffness to overcome the external disturbance torques in the right road wheel.

6. The method of claim 5 wherein the external disturbance torques include disturbance torque from wind gust.

7. The method of claim 1 further comprising:

calculating left and right road wheel angular rates from the sensed left and right road wheel angles;

determining a left road wheel angular rate feedback control variable based on the left road wheel angular rate using a rate loop compensator;

determining a right road wheel angular rate feedback control variable based on the right road wheel angular rate using the rate loop compensator, wherein the left road wheel angular rate feedback control variable is fed negatively to a left road wheel angular position loop for improving road wheel servo system damping performance and wherein the right road wheel angular rate feedback control variable is fed negatively to a right road wheel angular position loop for improving road wheel servo system damping performance.

8. The method of claim 1 wherein the multivariable road wheel controlled plant has coupled left and right road wheel angles with their input control variables.

9. The method of claim 8 wherein the left and right road wheel angles $\theta_{rl}$ and $\theta_{rr}$, the left and right road wheel angles change if the left road wheel input control variable $u_l$ changes and right road wheel input control variable $u_r$ maintains un-change through the coupling, and the left and right road wheel angles change if the right road wheel input control variable $u_r$ changes and left road wheel input control $u_l$ maintains un-change through the coupling.

10. The method of claim 1 wherein a multivariable decoupling control is implemented in the steer-by-wire multivariable road wheel system to realize independent control of the left and right road wheel angles.

11. The method of claim 10 wherein calculating the left and right road wheel angle errors include:

receiving the left road wheel angle error based on the left road wheel reference angle and the actual left road wheel angle; and receiving the right road wheel angle error based on the left road wheel reference angle and the actual left road wheel angle.

12. The method of claim 11 wherein generating the left and right road wheel torque control variables includes:

determining a left road wheel torque control variable based on the left road wheel angle error and the right road wheel angle error; and determining a right road wheel torque control variable based on the left road wheel angle error and the right road wheel angle error.

13. The method of claim 12 further comprising:

decoupling the left and right road wheel angles with the multivariable road wheel controller in the road wheel servo control system when the left and right road wheel torque control variables are generated;

wherein the multivariable road wheel controller controls the left road wheel angle based only on the left road wheel reference angle independent of the right road wheel reference angle and wherein the multivariable road wheel controller controls the right road wheel angle based only on the right road wheel reference angle independent of the left road wheel reference angle.

14. The method of claim 1 wherein a robust control is implemented in the multivariable road wheel controller to overcome affects of uncertainties and disturbances from the steer-by-wire system, vehicle, and external environment.

15. The method of claim 14 wherein the uncertainty of the road wheel controlled plant is given as $G(s)=G_0(s)(I+\Delta G(s))$ where $G_0(s)$ is a nominal multivariable controlled plant model, $\Delta G(s)$ represents a bound function of the uncertainty, and 1 is an identity matrix, and wherein the disturbance is represented as external disturbance torque to the left and right road wheels.

16. The method of claim 14 wherein the multivariable road wheel controller can be implemented using an $H_\infty$ control being a robust system control design including road wheel system sensitivity transfer function matrices of $S(s)=(I+G(s)K(s))^{-1}$ and road wheel system complementary sensitivity transfer function matrices of $T(s)=G(s)K(s)(I+G(s)K(s))^{-1}=(I-S(s))$ where $W_1(s)$ and $W_2(s)$ are relative weighting functions.

17. The method of claim 16 wherein requirements of the control system performances and robust stability are specified by weighting functions $W_1(s)$ for the road wheel system sensitivity function and $W_2(s)$ for the road wheel system complementary sensitivity function.

18. The method of claim 1 wherein the multivariable road wheel controller is implemented with a gain scheduling property which the gain of controller changes automatically with vehicle variables, such as vehicle speed, to properly compensate a gain change of the controlled road wheel plant to overcome non-linearity of road wheel system.

19. The method of claim 18 wherein the gain of the road wheel controlled plant changes substantially with vehicle dynamics, the road wheel controlled plant is non-linear, and the nominal road wheel controlled plant model is represented linearly in different operating points and a gain scheduling road wheel controller is designed based on each nominal linear controlled plant model.

20. The method of claim 1 wherein the road wheel reference angle generator generates left and right road wheel reference angles from the steering wheel angle using variable left and right steering ratio and calibration processes for I steering wheel angle.

21. The method of claim 20 wherein the road wheel reference angle generator has one steering wheel angle input and left and right road wheel reference angle outputs and has first and second stages to produce outputs of the left and right road wheel reference angles.

22. The method of claim 21 wherein the first stage includes:
producing left and right road wheel angles from the steering wheel angle signal using left and right steering ratio gains in the reference command generator; and
implementing a variable steering ratio by using vehicle speed as a scheduling signal to change the steering ratio gains.

23. The method of claim 22 wherein the second stage includes:
implementing a calibration for left and right road wheel angles according to vehicle geometry and steering performance requirements using vehicle variables in the reference command generator; and
obtaining the left and right road wheel reference angles in real time by using calibration variables including vehicle speed, yaw rate, and lateral acceleration.

24. A method of controlling a vehicle steer-by-wire system having two independent road wheels, the method comprising:
providing a steering wheel control sub-system to apply a steering wheel angle command for generating road wheel reference angles and for producing steering feel for a vehicle driver;
providing a road wheel control sub-system including a multivariable road wheel controlled plant and a multivariable road wheel controller for controlling actual road wheel angles to track to road wheel reference angles within a servo control system structure having road wheel angular position feedback and road wheel angular rate feedback loops;
modeling the multivariable road wheel controlled plant as $$\begin{bmatrix} \theta_{rl} \\ \theta_{rr} \end{bmatrix} = \begin{bmatrix} G_{ll}(s) & G_{rl}(s) \\ G_{lr}(s) & G_{rr}(s) \end{bmatrix} \begin{bmatrix} u_l \\ u_r \end{bmatrix},$$

wherein $\theta_{rl}$ is indicative of the left road wheel angle, $\theta_{rr}$ is indicative of the right road wheel angle, $u_l$ is indicative of the left road wheel torque control variable, $u_r$ is indicative of the right road wheel torque control variable, $G_{ll}(s)$ is indicative of a first plant transfer function between $\theta_{rl}$ and $u_l$, $G_{lr}(s)$ is indicative of a second plant transfer function between $\theta_{rr}$ and $u_l$, $G_{rl}(s)$ is indicative of a third plant transfer function between $\theta_{rl}$ and $u_r$, and $G_{rr}(s)$ is indicative of a fourth plant transfer function between $\theta_{rr}$ and $u_r$;
implementing the multivariable road wheel controller as $$\begin{bmatrix} u_l \\ u_r \end{bmatrix} = \begin{bmatrix} C_{ll}(s) & C_{rl}(s) \\ C_{lr}(s) & C_{rr}(s) \end{bmatrix} \begin{bmatrix} e_l \\ e_r \end{bmatrix},$$

wherein $u_l$ is indicative of the left road wheel torque control variable, $u_r$ is indicative of the right road wheel torque control variable, $e_l$ is indicative of the left road wheel angle error, $e_r$ is indicative of the right road wheel angle error, $C_{ll}(s)$ is indicative of a first controller transfer function between $u_l$ and $e_l$, $C_{lr}(s)$ is indicative of a second controller transfer function between $u_r$ and $e_l$, $C_{rl}(s)$ is indicative of a third controller transfer function between $u_l$ and $e_r$, and $C_{rr}(s)$ is indicative of a fourth controller transfer function between $u_r$ and $e_r$,
applying road wheel angles and angular rates as feedback signals to construct a road wheel servo control system of with the multivariable controlled plant and the multivariable road wheel controller to implement the left and right road wheel angles tracking for left and right road wheel reference angles;
receiving left and right road wheel reference angles being based on the steering wheel angle command from the steering wheel control sub-system;
receiving the left and right road wheel angles from the multivariable road wheel controlled plant;
calculating left and right road wheel angular rates from the sensed left and right road wheel angles;
determining a left road wheel angular rate feedback control variable based on the left road wheel angular rate using a rate loop compensator;
determining a right road wheel angular rate feedback control variable based on the right road wheel angular rate using the rate loop compensator, wherein the left road wheel angular rate feedback control variable is fed negatively to a left road wheel angular position loop for improving road wheel system damping performance, wherein the right road wheel angular rate feedback control variable is fed negatively to a right road wheel angular position loop for improving road wheel system damping performance;

determining the left road wheel angle error between the left road wheel reference angle and the actual received left road wheel angle by using the left road wheel angle negative feedback;

determining the right road wheel angle error between the right road wheel reference angle and the actual received right road wheel angle by using the left road wheel angle negative feedback;

decoupling the left and right road wheel angles with the multivariable road wheel controller in the road wheel servo control system when the left and right road wheel torque control variables are generated, wherein the multivariable road wheel controller controls the left road wheel angle based only on the left road wheel reference angle independent of the right road wheel reference angle and wherein the multivariable road wheel controller controls the right road wheel angle based only on the right road wheel reference angle independent of the left road wheel reference angle;

determining the left road wheel torque control variable based on the left road wheel angle error and the right road wheel angle error using the multivariable road wheel controller in the road wheel servo control system;

determining the right road wheel torque control variable based on the right road wheel angle error and the left road wheel angle error using the multivariable road wheel controller in the road wheel servo control system;

generating the left and right road wheel torque control variables from the multivariable road wheel controller with servo control performances based on the left and right road wheel angle errors;

applying left and right wheel torque control variables of the multivariable road wheel controller to the multivariable controlled plant to control tracking of the actual left and right wheel angles with the left and right road wheel reference angles, respectively;

applying actuation torque to the left road wheel based on the left road wheel torque control variable of the road wheel servo controller to independently control the actual left wheel angle and to track the left road wheel reference angle; and applying actuation torque to the right road wheel based on the right road wheel torque control variable of the road wheel servo controller to independently control the actual right wheel angle and to track the right road wheel reference angle, wherein a robust control is implemented in the multivariable road wheel controller to overcome affects of uncertainties and disturbances from the steer-by-wire system, vehicle, and external environment, and wherein the multivariable road wheel controller has gain scheduling property which the gain of controller changes automatically with vehicle variables, such as vehicle speed, to properly compensate a gain change of the controlled road wheel plant to overcome non-linearity.

25. A system for controlling a vehicle steer-by-wire system having two independent road wheels, the system comprising:

a steering wheel control sub-system to apply a steering wheel angle command for generating road wheel reference angles and for producing steering feel for a vehicle driver;

a road wheel control sub-system including a multivariable road wheel controlled plant and a multivariable road wheel controller for controlling actual road wheel angles to track to road wheel reference angles within a servo control system structure having road wheel angular position feedback and road wheel angular rate feedback loops, the multivariable road wheel controlled plant being modeled as $$\begin{bmatrix} \theta_{rl} \\ \theta_{rr} \end{bmatrix} = \begin{bmatrix} G_{ll}(s) & G_{rl}(s) \\ G_{lr}(s) & G_{rr}(s) \end{bmatrix} \begin{bmatrix} u_l \\ u_r \end{bmatrix},$$

wherein $\theta_{rl}$ is indicative of the left road wheel angle, $\theta_{rr}$ is indicative of the right road wheel angle, $u_l$ is indicative of the left road wheel torque control variable, $u_r$ is indicative of the right road wheel torque control variable, $G_{ll}(s)$ is indicative of a first plant transfer function between $\theta_{rl}$ and $u_l$, $G_{lr}(s)$ is indicative of a second plant transfer function between $\theta_{rr}$ and $u_l$, $G_{rl}(s)$ is indicative of a third plant transfer function between $\theta_{rl}$ and $u_r$, and $G_{rr}(s)$ is indicative of a fourth plant transfer function between $\theta_{rr}$ and $u_r$;

the multivariable road wheel controller being implemented as $$\begin{bmatrix} u_l \\ u_r \end{bmatrix} = \begin{bmatrix} C_{ll}(s) & C_{rl}(s) \\ C_{lr}(s) & C_{rr}(s) \end{bmatrix} \begin{bmatrix} e_l \\ e_r \end{bmatrix},$$

wherein $u_l$ is indicative of the left road wheel torque control variable, $u_r$ is indicative of the right road wheel torque control variable, $e_l$ is indicative of the left road wheel angle error, $e_r$ is indicative of the right road wheel angle error, $C_{ll}(s)$ is indicative of a first controller transfer function between $u_l$ and $e_l$, $C_{lr}(s)$ is indicative of a second controller transfer function between $u_r$ and $e_l$, $C_{rl}(s)$ is indicative of a third controller transfer function between $u_l$ and $e_r$, and $C_{rr}(s)$ is indicative of a fourth controller transfer function between $u_r$ and $e_r$, and a servo control system with the multivariable controlled plant and the multivariable road wheel controller, wherein the multivariable road wheel controller receives left and right road wheel reference angles being based on the steering wheel angle command from the steering wheel control sub-system and left and right road wheel angles from the multivariable road wheel controlled plant and calculates the left and right road wheel angle errors based on the left and right road wheel angles and left and right road wheel reference angles, wherein the multivariable road wheel controller generates the left and right road wheel torque control variables from the multivariable road wheel controller with servo control performances based on the left and right road wheel angle errors, and wherein the servo control system applies road wheel angles and angular rates as feedback signals for implementing tracking of left and right road wheel angles with left and right road wheel reference angles and applies torque control variables of the multivariable road wheel controller to the multivariable controlled plant to control tracking of the actual left and right wheel angles with the left and right road wheel reference angles, respectively.

* * * * *

UNITED STATES PATENT AND TRADEMARK OFFICE
CERTIFICATE OF CORRECTION

PATENT NO. : 6,694,239 B1
DATED : February 17, 2004
INVENTOR(S) : Yixin Yao et al.

It is certified that error appears in the above-identified patent and that said Letters Patent is hereby corrected as shown below:

<u>Title page,</u>
Item [57], ABSTRACT,
Lines 4-12, delete "to generate road wheel reference angles and to produce steering feel for a vehicle driver. The method further includes providing a road wheel control sub-system including a multivariable road wheel controlled plant and a multivariable road wheel controller for controlling actual road wheel angles to track to road wheen reference angles within a servo control system structure having road wheel angualr position feedback and road wheel angular rate feedback loops. The" and substitute -- and the -- in its place.
Line 13, after "modeling" delete "the" and substitute -- a -- in its place.
Line 14, after "implementing" delete "the" and substitute -- a -- in its place.
Lines 18-20, immediately after "road wheel controller" insert -- . -- (period) and delete "to implement the left and right road wheel angles tracking for left and right wheel reference angles."
Lines 21-23, after "reference angles" delete "being based on the steering wheel angle command from the steering wheen control sub-system".
Lines 24-25, after "wheel angles" insert -- . -- (period) and delete "from the multivariable road wheel controlled plant."
Lines 26-28, after "angle errors" delete "based on the left and right road wheel angles and left and right road wheel reference angles".
Lines 29-32, after "control variables" insert -- . -- (period) and delete "from the multivariable road wheel controller with servo control performances based on the left and right wheel angle errors. After generating road wheel torque control variables, the method".
Line 32, before "includes applying" insert -- The method further --.
Lines 34-36, after "controlled plant" insert -- . -- (period) and delete "to control tracking of the actual left and right wheel angles with the left and right road wheel reference angles, respectively."

UNITED STATES PATENT AND TRADEMARK OFFICE
CERTIFICATE OF CORRECTION

PATENT NO. : 6,694,239 B1
DATED : February 17, 2004
INVENTOR(S) : Yixin Yao et al.

It is certified that error appears in the above-identified patent and that said Letters Patent is hereby corrected as shown below:

Column 19,
Line 14, before "is an identity" delete "1" and substitute -- 1 -- in its place.

Signed and Sealed this

Fourteenth Day of September, 2004

JON W. DUDAS
*Director of the United States Patent and Trademark Office*